US007690464B2

(12) United States Patent
Yustick et al.

(10) Patent No.: US 7,690,464 B2
(45) Date of Patent: Apr. 6, 2010

(54) BATTERY PACKAGE MOUNT BRACKET

(75) Inventors: Robert Franklin Yustick, West Bloomfield, MI (US); Kip Mushisky, Monroe, MI (US); Gregg Davies, Gibraltar, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 302 days.

(21) Appl. No.: 11/843,103

(22) Filed: Aug. 22, 2007

(65) Prior Publication Data

US 2009/0050387 A1    Feb. 26, 2009

(51) Int. Cl.
*B60R 16/04* (2006.01)
(52) U.S. Cl. ...................................... 180/68.5; 224/400
(58) Field of Classification Search ................ 180/68.5; 224/400, 401, 441; 248/500, 503, 503.1
See application file for complete search history.

(56) References Cited

U.S. PATENT DOCUMENTS

| 4,252,206 | A  | * | 2/1981  | Burkholder et al. ........ | 180/68.5 |
| 5,939,858 | A  | * | 8/1999  | Dodd et al. ................. | 320/107 |
| 6,632,560 | B1 | * | 10/2003 | Zhou et al. .................... | 429/99 |
| 7,004,274 | B2 | * | 2/2006  | Shibasawa et al. ......... | 180/68.5 |
| 7,025,159 | B2 | * | 4/2006  | Smith et al. ............... | 180/68.1 |
| 7,066,515 | B2 | * | 6/2006  | Pierce et al. .................. | 296/21 |
| 7,401,669 | B2 | * | 7/2008  | Fujii et al. ................. | 180/65.1 |
| 2001/0030069 | A1 | * | 10/2001 | Misu et al. ................. | 180/68.1 |

* cited by examiner

*Primary Examiner*—Hau V Phan
(74) *Attorney, Agent, or Firm*—Tung & Associates

(57) ABSTRACT

A battery package mount bracket. An illustrative embodiment of the battery package mount bracket includes a body mounted bracket having a pair of spaced-apart bracket attachment flanges and an HEV mounted bracket detachably carried by the body mounted bracket. An HEV battery package is attached to the HEV mounted bracket. The HEV mounted bracket includes a main bracket plate and a transverse flange and a side flange extending from the main bracket plate in generally perpendicular relationship with respect to each other.

19 Claims, 3 Drawing Sheets

BATTERY PACKAGE MOUNT BRACKET

FIELD

The present disclosure relates to mount brackets. More particularly, the present disclosure relates to a battery package mount bracket which can be used to mount a HEV (High Energy Voltage) battery pack in a hybrid vehicle.

BACKGROUND

Hybrid vehicles require both fossil fuel engines and electric drive units. HEV (High Energy Voltage) battery packages are required for operation of the electric drive units in hybrid vehicles. However, because the HEV battery packages are a relatively large size, their strategic placement is necessary to accommodate overall space utilization; functional requirements; installation feasibility; ergonomics; and durability, NVH and crash load effects on the supporting body structure. Accordingly, HEV battery packages have conventionally been located flat on the trunk floor of the vehicle or in an upright position behind the rear seat back.

It has been found that mounting of the HEV battery package in an upright position behind the rear seat back provides optimum benefits but is ergonomically difficult or impossible for loading of the package through the trunk for attachment to the rear seat back. Another drawback includes the added cost and weight for body reinforcements to accommodate the weight of the package.

SUMMARY

The present disclosure is generally directed to a battery package mount bracket. An illustrative embodiment of the battery package mount bracket includes a body mounted bracket having a pair of spaced-apart bracket attachment flanges and an HEV mounted bracket detachably carried by the body mounted bracket. An HEV battery package is attached to the HEV mounted bracket. The HEV mounted bracket includes a main bracket plate and a transverse flange and a side flange extending from the main bracket plate in generally perpendicular relationship with respect to each other.

BRIEF DESCRIPTION OF THE DRAWINGS

The disclosure will now be made, by way of example, with reference to the accompanying drawings, in which.

DETAILED DESCRIPTION

Figure 1:
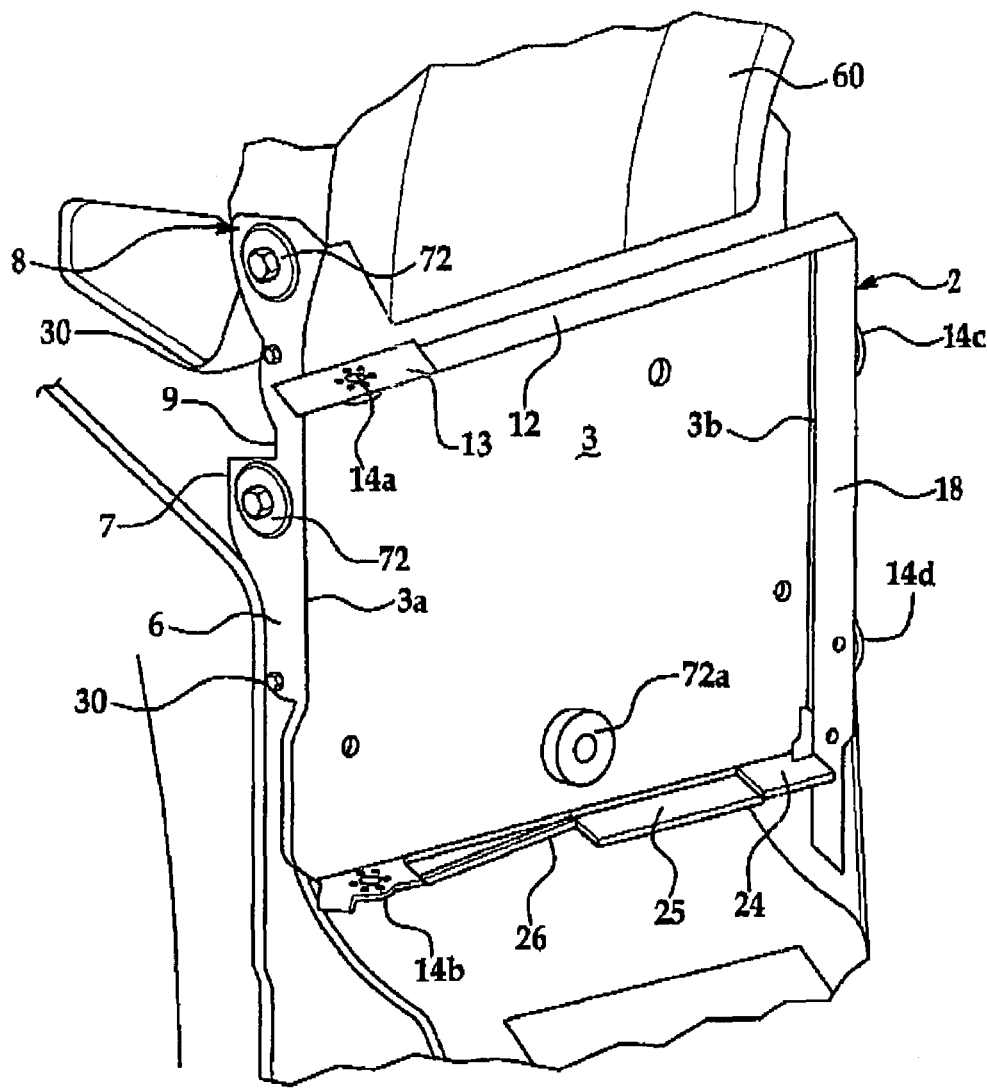
FIG. 1 is a perspective view of a body mounted bracket component of an illustrative embodiment of the battery package mount bracket, attached to a body pillar on a rear seat of a hybrid vehicle.

Referring initially to FIG. 1 of the drawings, an illustrative embodiment of the battery package mount bracket, hereinafter mount bracket, is generally indicated by reference numeral 1. The mount bracket 1 includes a body mounted bracket 2 which is adapted for attachment to a body pillar 60 which is typically on the rear surface of a back seat in a gasoline/electric hybrid vehicle. A high energy voltage (HEV) battery mounted bracket 38 (hereinafter HEV mounted bracket) is adapted for attachment to the body mounted bracket 2. An HEV battery package 64 is adapted for attachment to the HEV mounted bracket 38. Details in the structure and method of attachment of the body mounted bracket 2, the HEV mounted bracket 38 and the HEV battery package 64 will be hereinafter described.

Figure 2A:
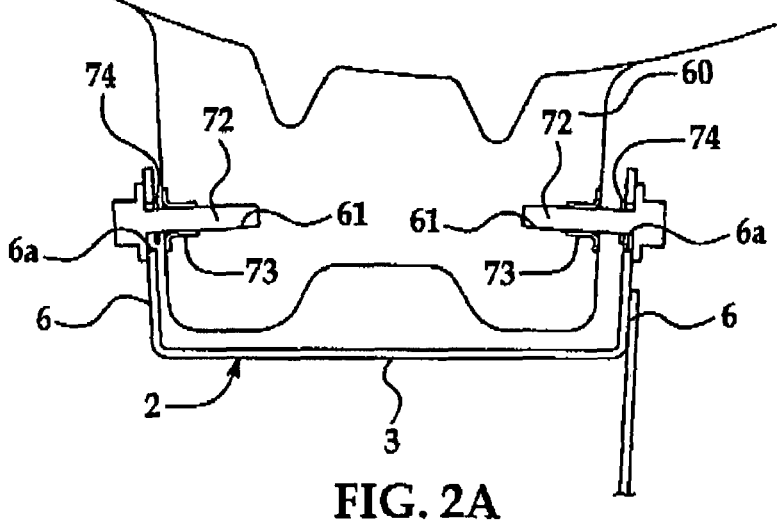
FIG. 2A is schematic view is a cross-sectional view of the body mounted bracket engaging the body pillar, with a pair of short bracket attachment fasteners and U-nuts attaching the body mounted bracket to the body pillar.

As shown in FIGS. 1 and 2A, the body mounted bracket 2 of the mount bracket 1 includes a main bracket plate 3 which may have a generally rectangular shape. The main bracket plate 3 has opposite first and second side edges 3a and 3b, respectively. A bracket attachment flange 6 extends from each of the first side edge 3a and the second side edge 3b. (Only the bracket attachment flange 6 which extends from the first side edge 3a is shown in FIG. 1).

The body mounted bracket 2 may be attached to the body pillar 60 using any suitable technique which is known to those skilled in the art. In some embodiments, each bracket attachment flange 6 includes a first fastener portion 7 and a second fastener portion 8 which are disposed in spaced-apart relationship with respect to each other. A flange notch 9 typically separates the first fastener portion 7 and the second fastener portion 8 from each other.

As shown in FIG. 2A, in some applications a pair of bracket attachment fasteners 72 is adapted for extension through a pair of fastener openings 6a, respectively, provided in each pair of first fastener portions 7 and second fastener portions 8 in the respective bracket attachment flanges 6. Each bracket attachment flange 6 may have a flat or planar shape. Each bracket attachment fastener 72 extends through a corresponding registering fastener opening 61 which is provided in the body pillar 60, as shown in FIG. 2A. A washer 74 may be provided on each bracket attachment fastener 72 between the bracket attachment flange 6 and the body pillar 60. A U-nut 73 is provided on each bracket attachment fastener 72 and engages the interior surface of the body pillar 60. Accordingly, the U-nuts 73 provide both front and rear access of a driver of the vehicle to the bracket attachment fasteners 72 to facilitate attachment and detachment of the body mounted bracket 2 with respect to the body pillar 60.

As shown in FIG. 1, an additional bracket attachment fastener 72a may extend through a fastener opening (not shown) provided in the main bracket plate 3 and through a registering fastener opening (not shown) provided in the body pillar 60 to further attach the body mounted bracket 2 to the body pillar 60. As further shown in FIG. 1, a pair of bracket locating pins 30 are extended through pair of corresponding bracket pin openings (not shown) provided in each bracket attachment flange 6 to engage a corresponding pair of bracket pin openings (not shown) provided in the body pillar 60 and facilitate proper location of the body mounted bracket 2 with respect to the body pillar 60 prior to attachment.

Figure 2B:
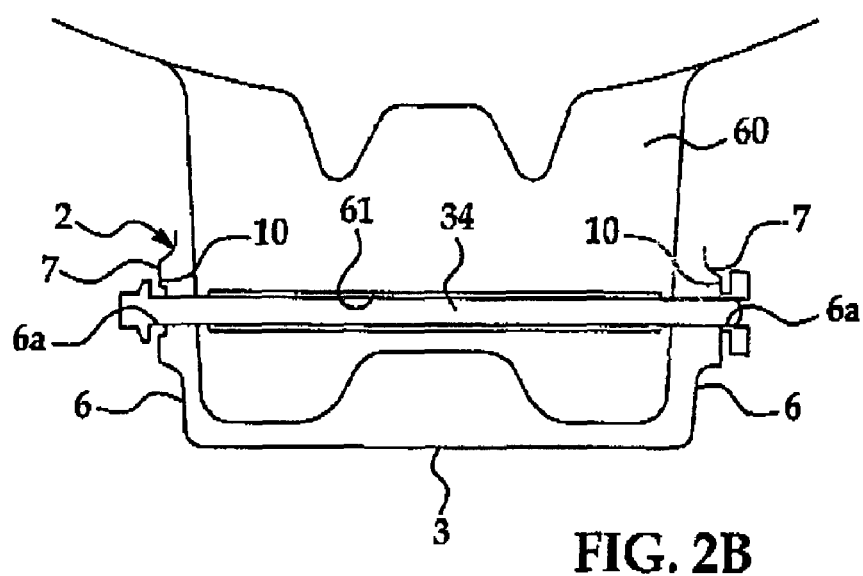
FIG. 2B is schematic view is a cross-sectional view of the body mounted bracket engaging the body pillar, with a long bracket attachment fastener attaching the body mounted bracket to the body pillar according to an alternative fastening technique.

As shown in FIG. 2B, in some applications (such as those in which the rearmost one of the bracket attachment fastener or fasteners 72 shown in FIG. 2A is inaccessible to a driver of the vehicle), an elongated bracket attachment fastener 34 is adapted for extension through registering fastener openings 6a provided in each pair of first fastener portions 7 and second fastener portions 8 in the respective bracket attachment flanges 6. Each bracket attachment fastener 34 extends through a corresponding fastener opening 61 which is provided in the body pillar 60, as shown in FIG. 2B. A flange depression 10 may be provided in the interior surface of each bracket attachment flange 6.

As shown in FIG. 1, a first transverse flange 12 extends from the main bracket plate 3. A battery pack guide ramp 13 extends from the first transverse flange 12. A side flange 18 extends from the second side edge 3b of the main bracket plate 3 in generally perpendicular relationship with respect to the first transverse flange 12. A second transverse flange 24 extends from the main bracket plate 3 in generally parallel, spaced-apart relationship with respect to the first transverse flange 12 and in generally perpendicular relationship with respect to the side flange 18. A flange depression 25 is typically provided in the second transverse flange 24. A safety tab 26 may be provided in the second transverse flange 24, adjacent to the flange depression 25. The safety tab 26 prevents the HEV battery package 64 (FIG. 4) from sliding back prior to attachment.

Figure 3:
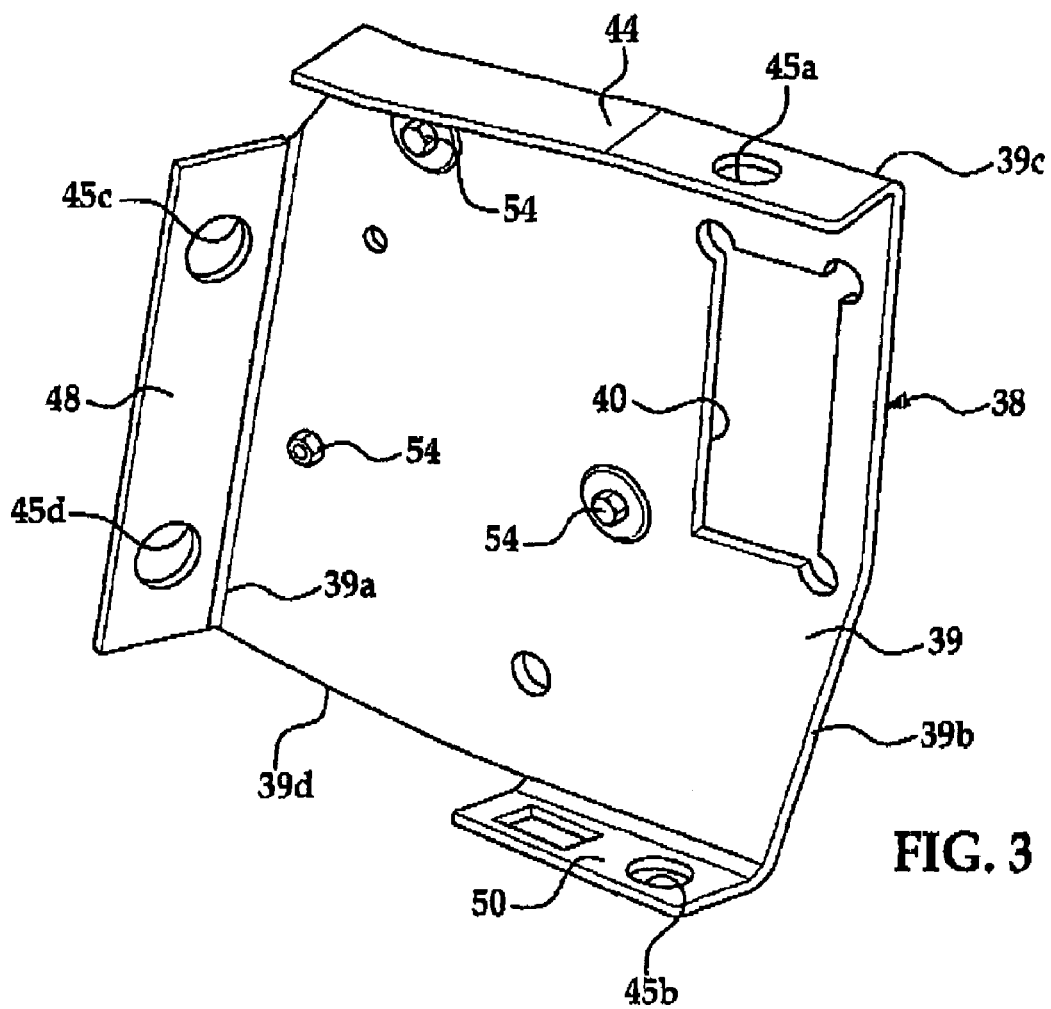
FIG. 3 is a perspective view of an HEV mounted bracket component of an illustrative embodiment of the battery package mount bracket.

As shown in FIG. 3, the HEV mounted bracket 38 includes a main bracket plate 39 which may have a generally rectangular shape. In some embodiments, a handle slot 40 from which extends handle slot flanges 41 (FIG. 4) extends through the main bracket plate 39. As shown in FIG. 3, the main bracket plate 39 of the HEV mounted bracket 38 has a first side edge 39a; a second side edge 39b; and first and second transverse edges 39c and 39d, respectively, which extend between the first side edge 39a and the second side edge 39b.

Figure 4:
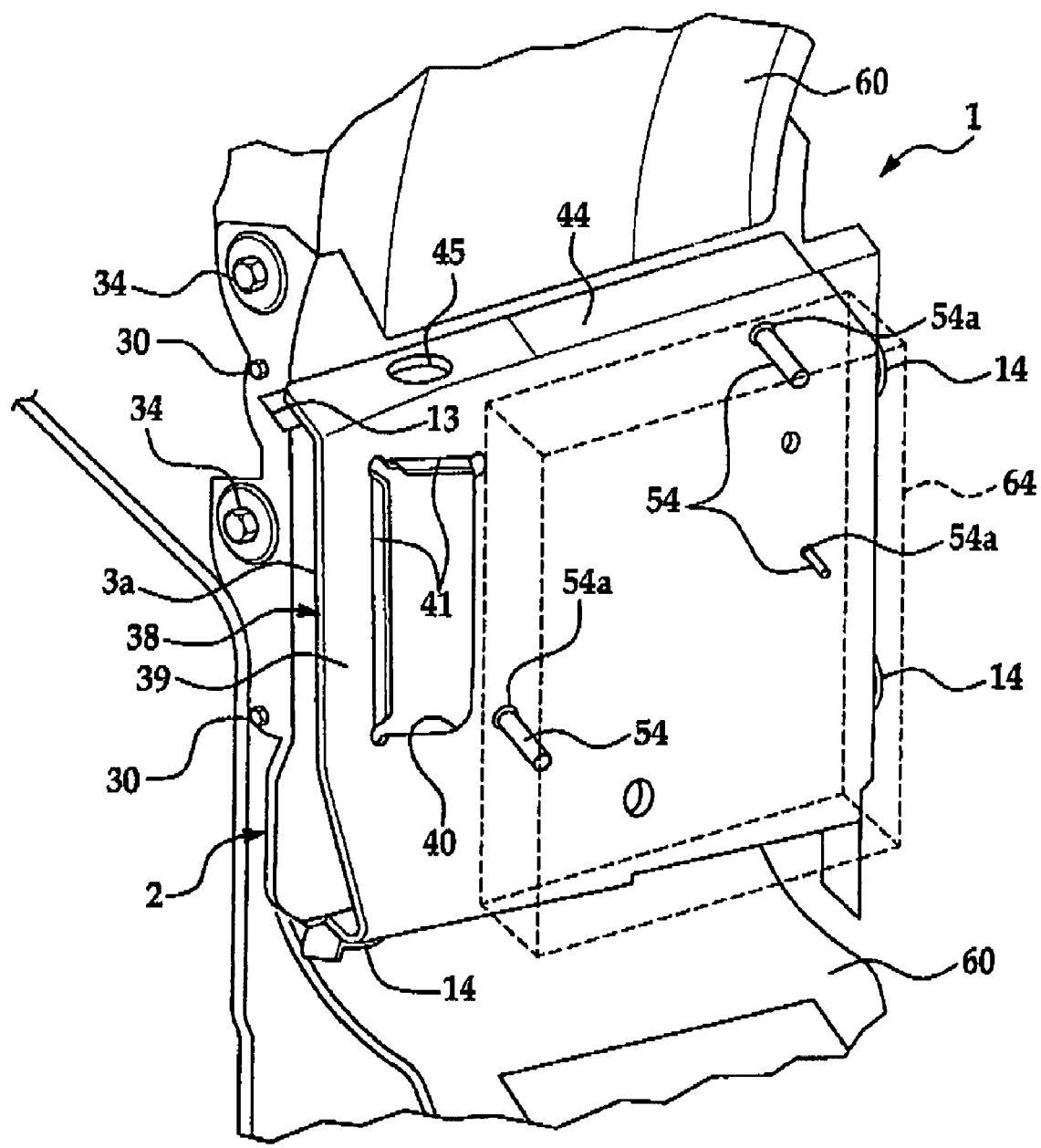
FIG. 4 is a perspective view of an illustrative embodiment of the battery package mount bracket, with the body mounted bracket attached to the body pillar on the rear seat of the hybrid vehicle and the HEV mounted bracket attached to the battery package mount bracket, further illustrating an HEV battery package (in phantom) attached to the HEV mounted bracket.

A generally elongated, rectangular side flange 48 extends from the first side edge 39a of the main bracket plate 39. The second side edge 39b is typically exposed. A generally elongated, rectangular first transverse flange 44 extends from the first transverse edge 39c, in generally perpendicular relationship with respect to the side flange 48. A second transverse flange 50 extends from a segment of the second transverse edge 39d, generally adjacent to the second side edge 39b. As shown in FIG. 4 and will be hereinafter described, the HEV battery package 64 is adapted for removable attachment to the HEV mounted bracket 38.

In typical use of the mount bracket 1, which will be hereinafter described, the HEV battery package 64 can be attached to the HEV mounted bracket 38 using any suitable technique which is known by those skilled in the art. The HEV battery package 64 is typically attached to the HEV mounted bracket 38 prior to attachment of the HEV mounted bracket 38 to the body mounted bracket 2. As shown in FIGS. 3 and 4, in some embodiments multiple peg openings 54a extend through the main bracket plate 39 of the HEV mounted bracket 38 in a selected pattern. An HEV mount peg 54 extends through each peg opening 54a. Multiple peg openings (not shown) which match the pattern of the HEV mount pegs 54 are provided in the HEV battery package 64 to receive the respective HEV mount pegs 54 in attachment of the HEV battery package 64 to the HEV mounted bracket 38.

The HEV mounted bracket 38 is attached to the body mounted bracket 2 using any suitable technique known to those skilled in the art. As shown in FIG. 1, in some embodiments a U-bracket attachment nut 14a is provided on the battery pack guide ramp 13 of the body mounted bracket 2. An additional U-bracket attachment nut 14b is provided on the second transverse flange 24, generally adjacent to the safety tab 26. A pair of spaced-apart U-bracket attachment nuts 14c and 14d, respectively, is provided on the side flange 18 of the body mounted bracket 2.

As shown in FIG. 3, a fastener opening 45a is provided in the first transverse flange 44 of the HEV mounted bracket 38. A fastener opening 45b is provided in the second transverse flange 50. A pair of spaced-apart fastener openings 45c and 45d, respectively, is provided in the side flange 48.

The HEV mounted bracket 38 is fitted on the body mounted bracket 2 by placing the first transverse flange 44, the second transverse flange 50 and the side flange 48 over the first transverse flange 12, the second transverse flange 24 and the side flange 18, respectively, of the body mounted bracket 2. Accordingly, the fastener openings 45a-45d of the NEXT mounted bracket 38 register with the respective U-bracket attachment nuts 14a-14d, respectively, of the body mounted bracket 2. A U-bracket (not shown) is extended through each fastener opening 45 and threaded through the corresponding registering U-bracket attachment nut 14 to attach the HEV mounted bracket 38 to the body mounted bracket 2.

In typical application, the mount bracket 2 provides an interface for attachment of the HEV battery package 64 (FIG. 4) to the body pillar 60, which is typically provided on the rear surface of a back seat (not shown) in a hybrid vehicle. Accordingly, the bracket attachment flanges 6 of the body mounted bracket 2 are fitted on respective sides of the body pillar 60. The bracket attachment flanges 6 and main bracket plate 3 of the body mounted bracket 2 are attached to the body pillar 60 using the bracket attachment fasteners 34 and 34a, respectively, as shown in FIG. 1. The HEV mounted bracket 38 is attached to the body mounted bracket 2 typically using the U-brackets (not shown) and U-bracket attachment nuts 14, as was heretofore described. The handle slot 40 initially provides grip points for a load arm (not shown, for installation of the HEV mounted bracket 38 and afterwards, as a service maintenance handle.

The HEV battery package 64 (FIG. 4) is typically attached to the HEV mounted bracket 38 prior to attachment of the HEV mounted bracket 38 to the body mounted bracket 2. Attachment of the HEV battery package 64 to the HEV mounted bracket 38 may be carried out by inserting the HEV mount pegs 54 (FIG. 4) which extend from the HEV mounted bracket 38 into the respective peg openings (not shown) provided in the HEV battery package 64, as was heretofore described. Under circumstances in which it is necessary to remove the HEV battery package 64 from the hybrid vehicle for replacement or recharging purposes, for example, the HEV mounted bracket 38 is initially removed from the body mounted bracket 2, after which the HEV battery package 64 is removed from the HEV mounted bracket 38.

It will be appreciated by those skilled in the art that the mount bracket 1 allows large HEV battery packages 64 to be loaded from the front passenger compartment through the rear passenger door (not shown) of the hybrid vehicle. The body mounted bracket 2 and the HEV mounted bracket 38 are characterized by manufacturing feasibility. The battery pack guide ramp 13 (FIG. 1) of the body mounted bracket 2 enables an HEV loading arm (not shown) to Locate the HEV battery package 64 and prevent HEV collisions with the body pillar 60 during installation. The mount bracket 1 provides safety lock features to hold the HEV battery package 64 between loading arm removal and final fastening. The mount bracket 1 also provides adequate body structure to accommodate durability, NVH and crash loads which result from the effects of HEV mass and geometry.

It will be further appreciated by those skilled in the art that the battery package mount bracket 1 need not be installed in a vehicle when the HEV battery package 64 is not selected as an option for the vehicle. This reduces the cost and weight of the vehicle.

While the preferred embodiments of the disclosure have been described above, it will be recognized and understood that various modifications can be made in the disclosure and the appended claims are intended to cover all such modifications which may fall within the spirit and scope of the disclosure.

What is claimed is:

1. A battery package mount bracket, comprising:
   a body mounted bracket having a pair of spaced-apart bracket attachment flanges, a main bracket plate, and a plurality of body mounted bracket flanges extending from said main bracket plate;
   an HEV mounted bracket detachably carried by said body mounted bracket; and
   wherein said HEV mounted bracket comprises a main HEV bracket plate and HEV mounted bracket flanges comprising spaced apart first and second transverse HEV flanges and a side HEV flange extending from said main bracket plate in generally perpendicular relationship with respect to each other;
   wherein said HEV mounted bracket flanges are each fitted and attached to a respective one of said body mounted bracket flanges.

2. The battery package mount bracket of claim 1 further comprising a plurality of mount pegs extending from said main bracket plate of said HEV mounted bracket.

3. The battery package mount bracket of claim 1 wherein each of said pair of spaced-apart bracket attachment flanges comprises a first fastener portion and a second fastener portion spaced-apart with respect to said first fastener portion.

4. The battery package mount bracket of claim 3 further comprising a flange notch between said first fastener portion and said second fastener portion.

5. The battery package mount bracket of claim 1 further comprising a handle slot provided in said main bracket plate of said HEV mounted bracket.

6. The battery package mount bracket of claim 1 further comprising a guide ramp provided on one of said plurality of flanges.

7. The battery package mount bracket of claim 1 further comprising a safety tab provided in one of said plurality of flanges.

8. A battery package mount bracket, comprising:
   a body mounted bracket including a main bracket plate having first and second side edges, a pair of spaced-apart bracket attachment flanges extending from respective ones of said first and second side edges, a first transverse flange extending from said main bracket plate, a side flange extending from said second side edge of said main bracket plate in generally perpendicular relationship with respect to said first transverse flange and a second transverse flange extending from said main bracket plate in spaced-apart relationship with respect to said first transverse flange;
   an HEV mounted bracket detachably carried by said body mounted bracket and including a main HEV bracket plate and a first transverse HEV flange and a side HEV flange extending from said main HEV bracket plate in generally perpendicular relationship with respect to each other and a second transverse HEV flange extending from said main HEV bracket plate in spaced-apart relationship with respect to said first transverse HEV flange; and
   wherein said first transverse HEV flange, said second transverse HEV flange and said side HEV flange of said HEW mounted bracket are attached to said first transverse flange, said second transverse flange and said side flange, respectively, of said body mounted bracket.

9. The battery package mound bracket of claim 8 further comprising a plurality of mount pegs extending from said main HEW bracket plate of said HEV mounted bracket.

10. The battery package mount bracket of claim 8 wherein each of said pair of spaced-apart bracket attachment flanges comprises a first fastener portion and a second fastener portion spaced-apart with respect to said first fastener portion.

11. The battery package mount bracket of claim 10 further comprising a flange notch between said first fastener portion and said second fastener portion.

12. The battery package mount bracket of claim 8 further comprising a handle slot provided in said main HEV bracket plate of said HEV mounted bracket.

13. The battery package mount bracket of claim 8 further comprising a guide ramp provided on said first transverse flange of said body mounted bracket.

14. The battery package mount bracket of claim 8 further comprising a safety tab provided in said second transverse flange of said body mounted bracket.

15. A battery package mount bracket, comprising:
   a body mounted bracket including a main bracket plate having first and second side edges, a pair of spaced-apart bracket attachment flanges extending from respective ones of said first and second side edges, a first transverse flange extending from said main bracket plate, a side flange extending from said second side edge of said main bracket plate in generally perpendicular relationship with respect to said first transverse flange and a second transverse flange extending from said main bracket plate in spaced-apart relationship with respect to said first transverse flange;
   a guide ramp provided on said first transverse flange of said body mounted bracket;
   a safety tab provided in said second transverse flange of said body mounted bracket;
   an HEV mounted bracket detachably carried by said body mounted bracket and including a main HEV bracket plate and a first transverse HEV flange and a side HEN flange extending from said main HEV bracket plate in generally perpendicular relationship with respect to each other and a second transverse HEV flange extending from said main HEV bracket plate in spaced-apart relationship with respect to said first transverse flange;
   a plurality of U-bracket attachment nuts provided on said first transverse flange, said second transverse flange and said side flange, respectively, of said body mounted bracket;
   a plurality of fastener openings provided in said first transverse HEV flange, said second transverse HEV flange and said side HEV flange, respectively, of said HEV mounted bracket; and
   wherein said first transverse HEV flange, said second transverse HEV flange and said side HEV flange of said HEV mounted bracket are attached to said first transverse flange, said second transverse flange and said side flange, respectively, of said body mounted bracket.

16. The battery package mount bracket of claim 15 further comprising a plurality of mount pegs extending from said main HEV bracket plate of said HEV mounted bracket.

17. The battery package mount bracket of claim 15 wherein each of said pair of spaced-apart bracket attachment flanges comprises a first fastener portion and a second fastener portion spaced-apart with respect to said first fastener portion.

18. The battery package mount bracket of claim 17 further comprising a flange notch between said first fastener portion and said second fastener portion.

19. The battery package mount bracket of claim 15 further comprising a handle slot provided in said main bracket plate of said HEV mounted bracket.

* * * * *